Jan. 7, 1958 M. W. BANG 2,819,458
CATHODE RAY TUBE POSITIONING DEVICE
Filed Aug. 6, 1953
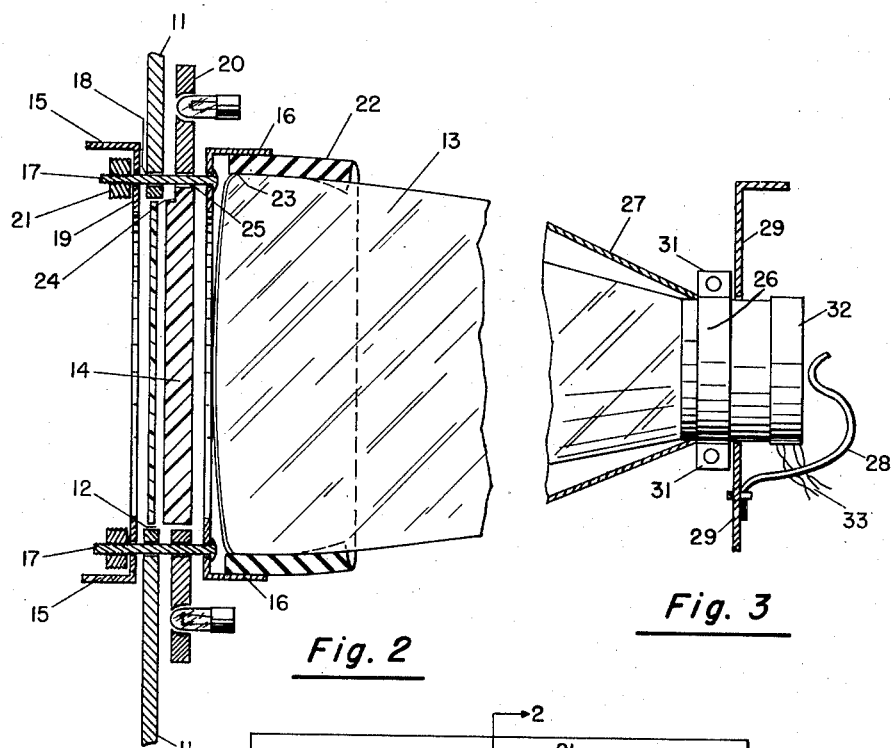
Fig. 2
Fig. 3
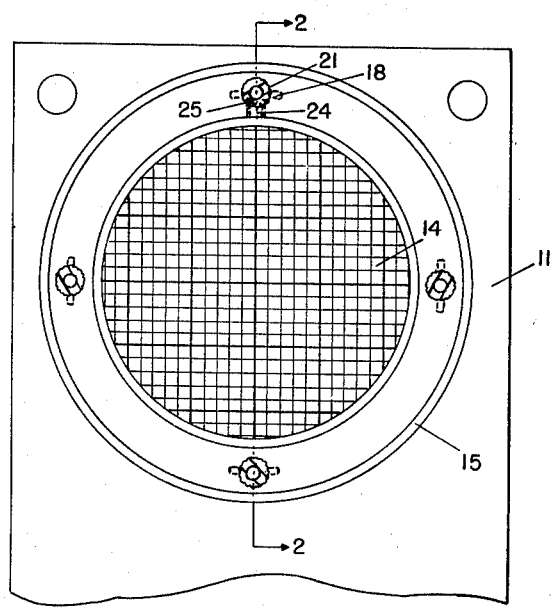
Fig. 1
INVENTOR.
MOGENS W. BANG
BY Darby & Darby
ATTORNEYS

United States Patent Office 2,819,458
Patented Jan. 7, 1958

2,819,458

CATHODE RAY TUBE POSITIONING DEVICE

Mogens W. Bang, Montclair, N. J., assignor to Allen B. Du Mont Laboratories, Inc., Clifton, N. J., a corporation of Delaware Application August 6, 1953, Serial No. 372,642

2 Claims. (Cl. 340—368)

This invention relates to a device for positioning or rotating a cathode ray tube mounted or contained in an instrument.

With the increasing use of fixed calibration marks or lines on transparent plates placed in front of the face of cathode ray tubes used in cathode ray oscillographs and instruments of similar type for precise measurements, it becomes extremely important that the deflection plates contained within the envelope of the tube be physically aligned with these calibration lines. Because of the presence of dangerous high voltages in the operation of cathode ray tubes, most instruments employing cathode ray tubes are completely housed in a cabinet equipped with electrical interlocks so that if the cabinet is removed the instrument is rendered inoperative. With such instruments, the practice is to align the tube with the markings on the calibrated screen at the time of test on final assembly. It has been found, however, that frequently the position of the tube shifts during shipment.

It is an object of this invention, therefore, to provide means for aligning or re-aligning the tube from the outside of the cabinet and while the instrument is in operation.

It is another object to provide means for making this adjustment at the viewing end of the tube so that the extent of the adjustment may be readily and immediately discerned.

For a clear understanding of the invention, reference is made to the following specification in connection with the drawing, of which:

Fig. 1 is a front elevational view of the instrument.

Fig. 2 is an elevational sectional view of the front panel of the instrument taken along the line 2—2 of Fig. 1, showing the details of the cathode ray tube holder at the front panel, and Fig. 3 is an elevational side view showing the means for supporting the rear or socket end of the tube.

Referring now to Fig. 2, reference character 11 indicates the front panel of an instrument containing a large opening 12 through which the face of a cathode ray tube 13 may be observed through a calibrated and edge illuminated screen 14. Around the opening 12 on the front of the panel a bezel 15 is provided for the purpose of supporting additional equipment such a viewing hood, recording camera, etc. At the rear of the panel and surrounding the opening 12 is provided a second bezel 16 which is provided with four fixed threaded studs 17 protruding through arcuate slots 18 in the front panel 11 and sub-panel 20, and round holes 19 in the front bezel. Knurled and slotted nuts 21 are provided to tighten the assembly. Secured to rear bezel is a resilient rubber ring 22 so formed that it has a loose fit on the screen end 23 of the tube 13 to shock mount the tube and take up tolerances in the glass envelope. The rear part of the rubber ring is formed so that it has a tight grip on the surface of the glass envelope making the turning of the tube possible. By loosening the nuts 21, and grasping the front bezel 15, the tube may be rotated to the limits of the arcuate slots 18, thus aligning the deflection paths of the beam with the calibrated screen 14. The screen 14 is prevented from turning by the provision of an ear 24 on the calibrated screen which fits into a slot 25 on the front panel.

Referring to Fig. 3, the rear of the tube is supported by a clamping ring 26 which carries a metallic shield 27. The socket holder spring 28 is secured to a bracket 29 which is provided with an opening in which the clamping ring may turn freely. The tube is prevented from moving axially to the rear by the ears 31 of the clamping ring and is also urged forward by the tension of the socket holder spring 28. Electrical connections are made to the base pins of the tube through socket 32 and leads 33.

While I have described one specific embodiment, the invention is defined by the following claims.

What is claimed is:

1. An electrical instrument comprising a panel having an opening therethrough, a cathode ray tube mounted within said instrument, with the viewing screen thereof in said opening, a first bezel on the front surface of said panel surrounding said opening, a second bezel on the rear surface thereof, said second bezel being provided with a plurality of threaded studs extending through said panel and said first bezel, a resilient ring secured to said second bezel and adapted to grip said cathode ray tube, whereby, by rotating said first bezel, said second bezel and said resilient ring and said cathode ray tube are caused also to rotate.

2. In an electrical instrument, a cathode ray tube mounted therein, a panel thereof having an opening therein, a calibrated screen mounted on said panel within said opening, means for rotating said cathode ray tube axially with respect to said calibrated screen, said means comprising a pair of rigidly connected bezels, one of said bezels being provided with a resilient ring which securely grips the envelope of said cathode ray tube, the other of said bezels being accessibly located on the exterior of said instrument whereby by rotating said last mentioned bezel, said cathode ray tube is rotated with respect to said calibrated screen.

References Cited in the file of this patent

UNITED STATES PATENTS

| 2,497,078 | Gall | Feb. 14, 1950 |
| 2,505,736 | Herscher et al. | Apr. 25, 1950 |
| 2,515,221 | Henning | July 18, 1950 |